United States Patent [19]

Moyher, Jr. et al.

[11] Patent Number: 5,069,782

[45] Date of Patent: Dec. 3, 1991

[54] FLUID PURIFICATION SYSTEMS

[75] Inventors: George C. Moyher, Jr., Bluff City, Tenn.; Randy Jamerson, Bristol, Va.; David Nessim, Bristol, Tenn.; Jeffrey Kapec, Westport; Kazuna Tanaka, Cos Cob, both of Conn.; Allan Chochinov, Brooklyn, N.Y.

[73] Assignee: Electrolux Water Systems, Inc., Marietta, Ga.

[21] Appl. No.: 514,603

[22] Filed: Apr. 26, 1990

[51] Int. Cl.⁵ .................. B01D 36/00; C02F 1/32
[52] U.S. Cl. .................. 210/192; 210/282; 210/259; 210/459; 250/437; 422/24; 422/186.3
[58] Field of Search .............. 210/192, 282, 449, 459, 210/748, 259; 250/435–438; 422/24, 186.3; 285/239, 243

[56] References Cited

U.S. PATENT DOCUMENTS

| D. 282,962 | 3/1986 | Gerber | D23/43 |
|---|---|---|---|
| 3,670,892 | 6/1972 | Baerg et al. | 210/134 |
| 3,923,663 | 12/1975 | Reid | 422/24 |
| 4,274,970 | 6/1981 | Beitzel | 210/748 |
| 4,556,484 | 12/1985 | Hunter et al. | 210/459 |
| 4,597,594 | 8/1986 | Kacalief et al. | 285/239 |
| 4,769,131 | 9/1988 | Noll et al. | 422/24 |
| 4,798,702 | 1/1989 | Tucker | 422/24 |
| 4,855,064 | 8/1989 | Schlein | 210/206 |
| 4,909,931 | 3/1990 | Bibi | 422/24 |

FOREIGN PATENT DOCUMENTS 2152611A   9/1985   United Kingdom ............ 285/239

Primary Examiner—Peter Hruskoci
Assistant Examiner—Robert James Popovics
Attorney, Agent, or Firm—McAulay, Fisher, Nissen, Goldberg & Kiel

[57] ABSTRACT

A water purification system has a longitudinal ultraviolet tube, an arrangement of helically-wound coils surrounding the tube and a filter. Water is exposed to ultraviolet energy before and after flowing through the filter. The filter, ultraviolet tube and helically wound coils are all arranged within a unitary housing adapted for kitchen countertop, sink backsplash or under wall cabinet mounting. The system is capable of operatng directly from a kitchen sink faucet. Connecting elements for the coils are specially designed to be leak-proof. A closed, reflective chamber surrounds the ultraviolet arrangement.

6 Claims, 4 Drawing Sheets

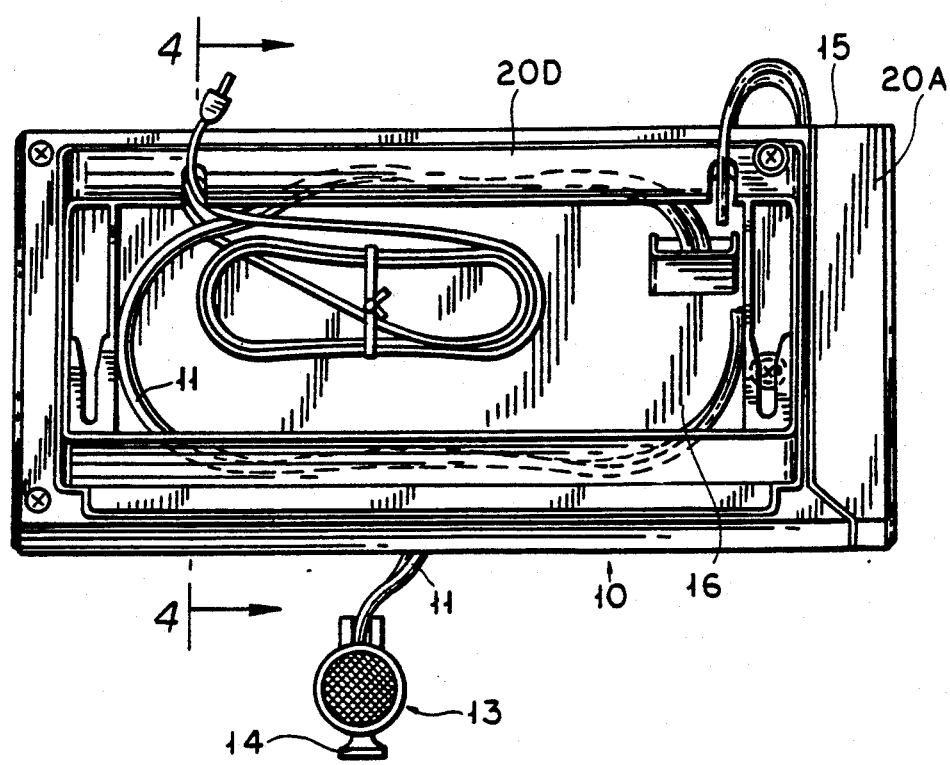
FIG. 2
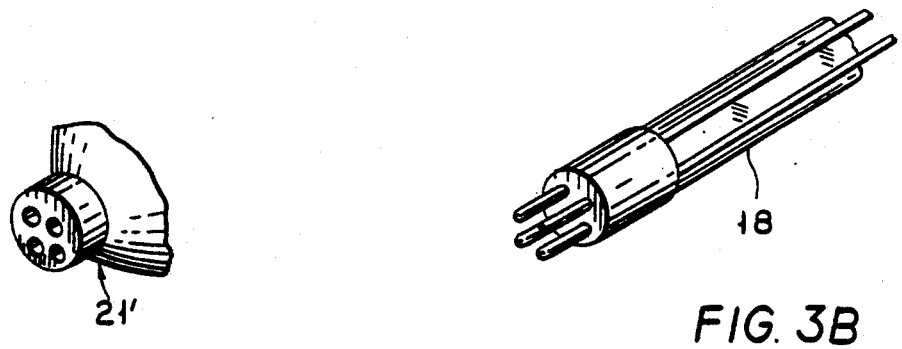
FIG. 3A
FIG. 3B
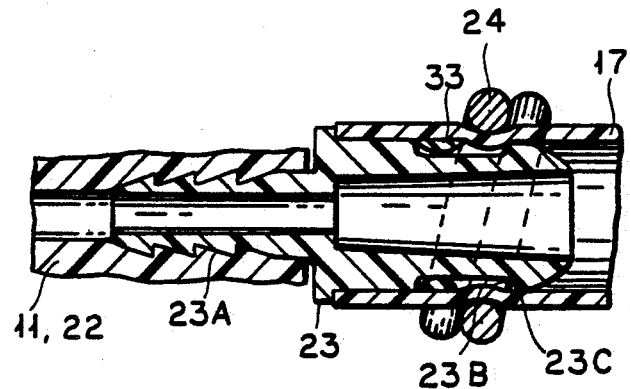
FIG. 5

FLUID PURIFICATION SYSTEMS

BACKGROUND OF THE PRESENT INVENTION

1. Field of the Present Invention

The present invention relates to fluid purification systems and, more particularly, to improvements in fluid purification systems which employ ultraviolet radiation and particle filtration.

2. Description of the Prior Art

The public's concern for high quality, potable drinking water is reflected in increasing purchases of bottled water and water purification systems. This concern is even more pronounced in "third world" countries where good quality drinking water can be a costly commodity.

One type of water purification system which corrects for bacterial and viral growth in a carbon filter employs ultraviolet radiation exposure before and after the filter to prevent such growth in the filter. A helically-coiled arrangement of Teflon ® tubing surrounding an ultraviolet radiation-emitting tube exposes water flowing through the tubing to ultraviolet energy. The ultraviolet energy and exposure time are chosen to be of sufficient magnitude to kill the microorganisms and viruses before they reach the filter. A system of this type is disclosed in U.S. Pat. No. 4,769,131 to Noll et al.

While the helically-coiled arrangement of the '131 patent enables a compact system to be constructed which is suitable for household use, such system typically is of a size which requires mounting under the kitchen sink. Further, connections of the type shown in the drawings of the '131 patent, in practice, often leak, thereby causing serious and frequent maintenance problems for units of this type.

OBJECTS OF THE PRESENT INVENTION

It is an object of the present invention to provide a water purification system employing ultraviolet energy which is configured for use above the ordinary home kitchen counter.

It is a further object of the present invention to provide a water purification system of the above type which may be used either on a kitchen countertop or under a kitchen wall cabinet.

It is a still further object of the present invention to provide a water purification system, employing plastic tubing for conducting water to and from a filter, having leak-proof connections at connection points to the tubing.

In accordance with the present invention, in a water purification system having a longitudinal tube for the supply of ultraviolet energy, and helically-wound, ultraviolet energy-transparent, plastic coils surrounding the tube, and a filter, water is exposed to ultraviolet energy before and after flowing through the filter. The improvement comprises that the filter, ultraviolet energy producing tube and helically-wound coils are all arranged within a unitary housing adapted for kitchen countertop, or sink backsplash or underwall cabinet mounting and where the system is capable of operating directly from a kitchen sink faucet.

For a better understanding of the present invention, reference is made to the following description and accompanying drawings while the scope of the invention will be pointed out in the appended claims.

BRIEF DESCRIPTION OF THE DRAWINGS

In the drawings,

FIG. 2 is a plan view of the water purifier of the present invention taken from the mounting on support side thereof;

FIG. 3A is a perspective view of the preferred construction for blind cone 21' for cooperation with a 4 terminal ultraviolet rube as shown in perspective in FIG. 3B;

FIG. 5 shows an important feature of the present invention, in cross section taken along 5—5 of FIG. 4, i.e., a fluid-tight connection between the helically-wound Teflon ® coils and the tubing leading to the filter and water spout.

DESCRIPTION OF THE PREFERRED EMBODIMENTS

Figure 1:
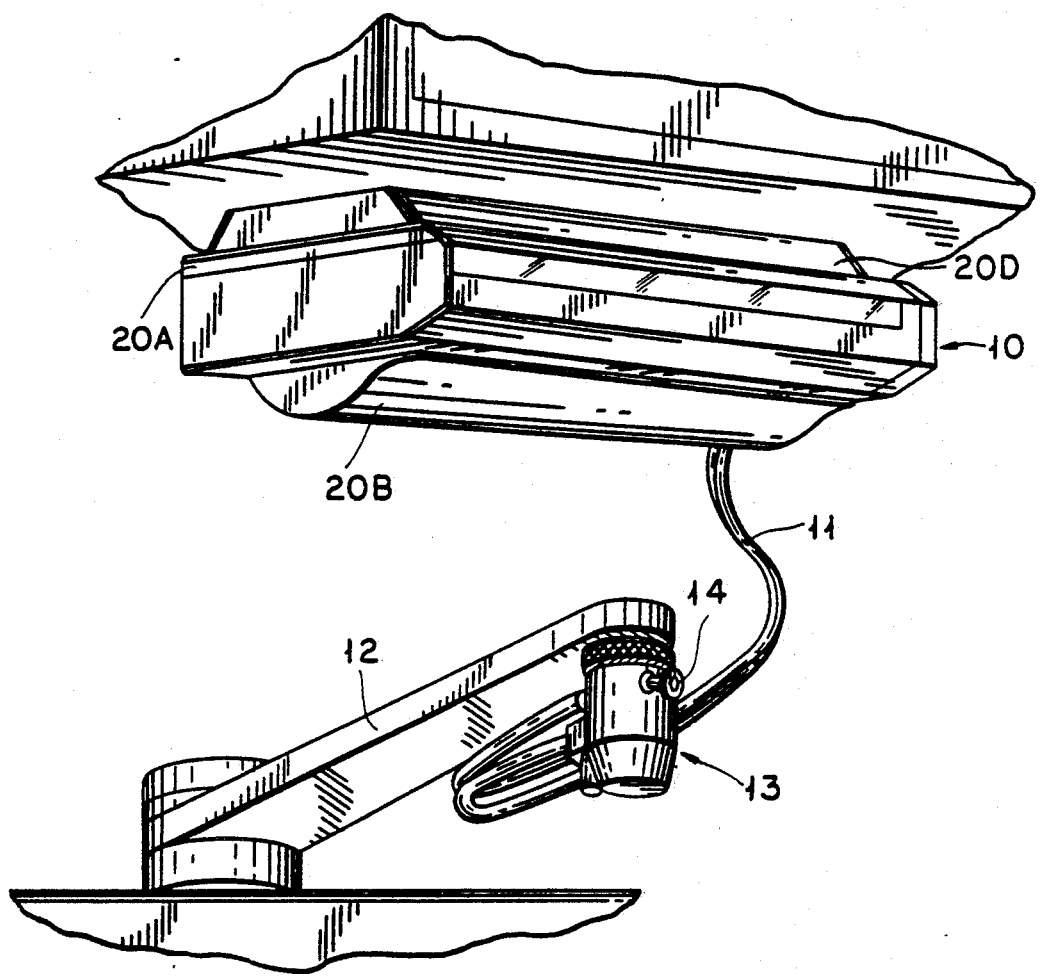
FIG. 1 is an overall perspective drawing of a water purifier of the present invention, mounted under a wall cabinet, in operative connection with a sink water spout.

Referring initially to FIG. 1, a water purifier arrangement in accordance with the present invention is shown. In the depicted approach, the water purifier 10 is mounted under a wall cabinet in a typical home kitchen. It should be understood that the system is small enough to be able to rest on the counter-top itself without taking an excessive amount of room or it may also be mounted on the backsplash wall of the kitchen behind the sink.

The system employs a commercially-available diverter valve 13 controlled by knob 14 to draw unfiltered water from the kitchen faucet 12 and to dispense filtered water to the user through a secondary spout. A diverter valve of this type is available under the model number 800 BDC and is manufactured by Butler Valve, Canoga Park, Calif. Water supply and return tubing 11 takes the water from the diverter valve and brings it to the purifier and returns the filtered water to the secondary spout. The preferred tubing is an ether-based polyurethane composition. To activate the unit, the kitchen faucet 12 is turned on and the knob 14 on the diverter valve is pulled out. This diverts the unfiltered water to the filtration system through one side of the tubing 11. The knob will remain in the outward position as long as the faucet is turned on.

Figure 3:
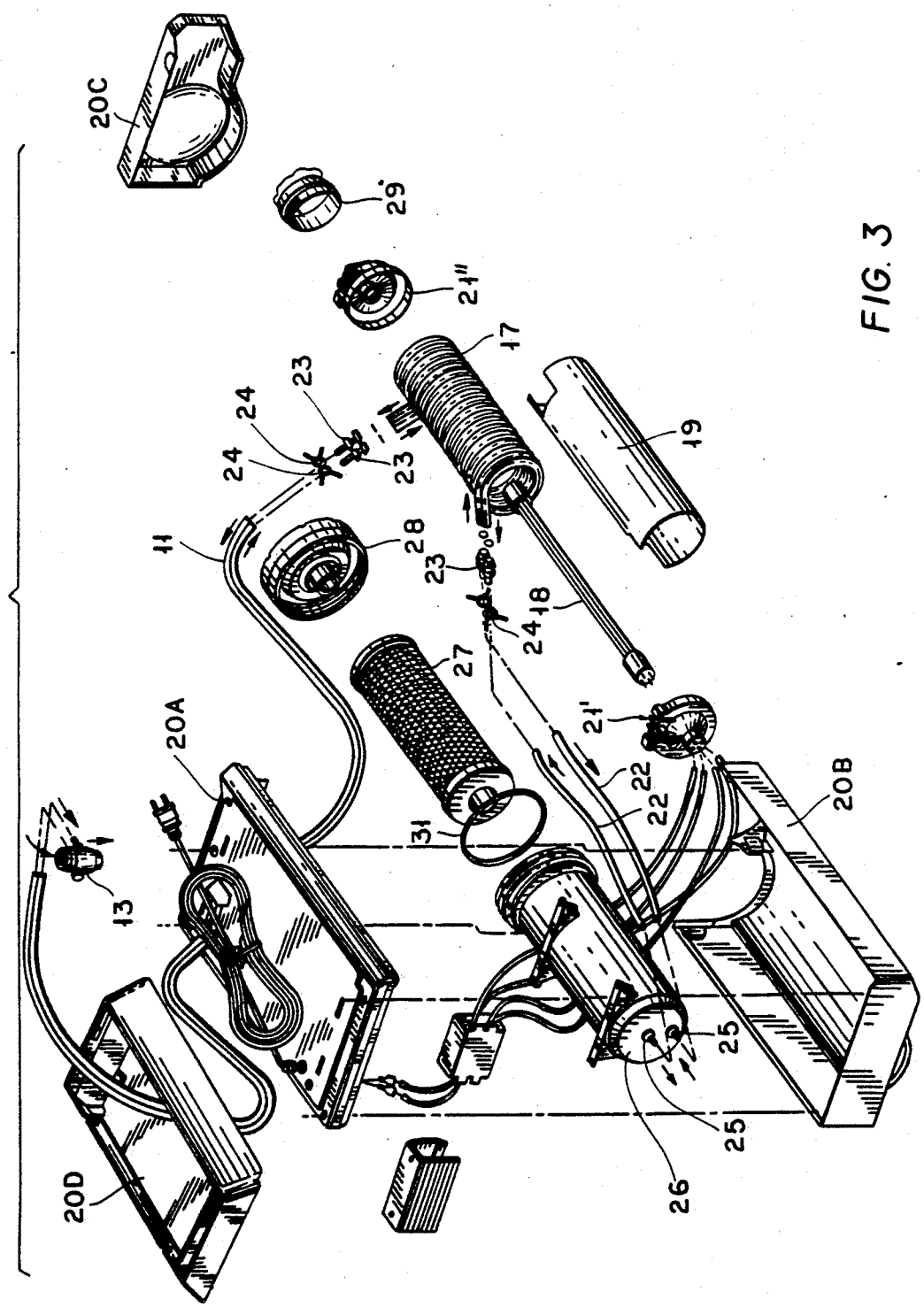
FIG. 3 is a broken-away, perspective view of the essential parts of the water purifier of the present invention.

Shown in FIG. 2 is the housing for the purification system 15 which includes a top storage portion 16. The electrical wire may be stored or shortened in this portion. The primary parts of the system are shown in somewhat operative inter-connection in FIG. 3. The separate parts of the housing are shown as storage part 20d, top portion 20a, bottom portion 20b and door or side portion 20c. The principal operating elements include the ultraviolet tube 18 around which a pair of helical coils 17 are wound. The coils may either be wound in tandem fashion or in sequential fashion. FIG. 3 illustrates a tandem winding of the coils. The other major element is the filter which includes filter housing 26, filter element 27, typically carbon, and filter cap 28.

The unfiltered water enters via diverter valve and through the tubing 11 which is connected to one of the helical coils. After flowing through that coil (during which the water is exposed to ultraviolet energy supplied by ultraviolet energy-supplying tube 18), the water is directed via one of the coupling tubes 22 to the filter through one of the barbed nipple elements 25. Water then flows through the filter and is returned from the filter, emerging from the other barbed nipple element 25 through tubing 22, through the other helical coil, back through tube 11 and out of the spout 13.

An important portion of the invention is the coupling between the helical coils and the tubes 11 and 22. This is done by way of nipple connectors 23 and rotor clips 24. The design of this connection element is critical to long-term, leak-proof performance. The material selected for the nipple connector 23 had to meet the following requirements:

1. It had to be approved by the National Sanitation Foundation for potable water;
2. It had to have high strength in small sections;
3. It had to be able to withstand ultraviolet light without degradation.

The material selected for the nipple connector is a glass filled plastic, Noryl RFN-20, manufactured by General Electric Corporation. The selection of a material which is glass-filled provides the necessary strength required.

Reference to FIG. 5 illustrates the design in greater detail. The connector has a barbed slide-in portion 23a for accommodating the smaller diameter tube or 22. By choosing the optimum combination of tube inner diameter to the barbed element outer diameter, it is capable of having 150 pounds per square inch of pressure for 15 minutes and 0-50 PSI cycling for 10,000 cycles without leakage. A preferred relationship between connector and tubing is that the outer diameter of the barbed connector is 1/16 inch larger than the inner diameter of the tubing. These tests are NSF requirements. Such arrangement avoids the need for external clamping. The same barbed design is incorporated in the nipples 25 on the cartridge housing and on the connections to the diverter valve.

Connection to the Teflon ® tube portion of the helical coil arrangement proved more difficult because of the long term cold flow that the Teflon ® exhibits. Further, the manufacturing process for coiling the Teflon ® tube results in a "D" shaped inner diameter rather than a circular one. Thus, the connector in this portion, 23b, was required to fit into the Teflon ® tube and reshape the inner diameter of the tube so that it closed in a circle. This enabled an "O" ring seal to be used. This end of the nipple connector has a large radius. Its ID purpose is to reduce the insertion force as it reforms the Teflon ® ID and also to reduce the intensity of any reflected ultraviolet light if it "light pipes" through the water.

It was found that a standard "O" ring groove would not give a consistent seal after insertion because the "O" ring was allowed to rotate on itself approximately 180° during insertion. This connection would hold low pressure for the short term but then the Teflon ® could cold flow around the "O" ring, thus causing a leak.

The inventive solution employs a rotor clip and utilizes an increased length of the "O" ring groove 23c. The "O" ring is shown as 33. The rotor clip 24 maintains a specified clamping force over a range of diameters and therefore compensates for the cold flow. With the Teflon ® cold flow moving into the "O" ring groove, it creates a mechanical interface with the connector which allows the connection to pass the 150 PSI National Sanitation Foundation requirements. Thus the length of the "O" ring groove is defined as half the circumference of the "O" ring cross-sectional area plus the diameter of wire used to make the rotor clip. Also, by keeping equal diameters on each side of the groove, it is guaranteed that the Teflon ® tube will remain concentric to the "O" ring sealing area.

The barbed nipple elements 25 are molded integrally with the filter housing and are comparable to nipple portions 23a. One of the barbed elements on the filter housing leads to the center of the filter cartridge 27 and the other leads to the outside periphery of the filter cartridge. When the cartridge is inserted into the filter housing and the filter cap 28 is screwed on, knife edge seals in the filter housing and cap separate the outside of the filter cartridge from the inside. The unfiltered water is exposed to the largest area of the filter (outside) and then flows to the center of the cartridge where the second set of barbed elements routes the now-filtered water through a single polyurethane tube and then through the second Teflon ® coil. Connections are similar to the first coils using the nipple connector. After the filtered water receives its second pass through the ultraviolet light, it heads back to the diverter valve and exits through the filtered water spout.

Another significant feature of the present invention is the ultraviolet chamber which is designed to keep ultraviolet energy leakage to a minimum. This chamber is made up of the blind cone 21', the access cone 21", the reflector shield 19 and its grommets (not shown). Encased within these parts are the Teflon ® coils 17 and the light source 18. The ultraviolet shield 19 is preferably made of 0.20 inches thick aluminum with a maximum surface finish of 45 RMS which will reflect approximately 50% of the ultraviolet energy back into the coils; it has locking tabs and two slots for the entering and exiting of the Teflon ® tubes. The shield is then rolled to a diameter just exceeding the diameter of the Teflon ® coils and is placed around the Teflon ® coils and held in place by the locking tabs. Grommets are used to cover the ends of the Teflon ® coils where they exit the shield to prevent any sharp edges from scratching the coils. This cylindrical subassembly can now receive the cones 21' and 21". Each of the cones has a counterbored diameter that matches the OD of the shield/coil assembly and, therefore, can nest with the shield/coil assembly. The blind cone 21" is located at the far end of the unit where the user inserts the ultraviolet bulb 18. This cone holds all the necessary electrical connectors at the correct spacing to receive the light bulb. The side of the cone that is facing the direction from which the light bulb is inserted is cone-shaped and aids in the locating and insertion of the bulb into the electrical connectors.

The blind cone 21' shown in FIG. 3A and the four terminal ultraviolet tube in FIG. 3B illustrate a preferred arrangement for connection to the ultraviolet tube. There, the arrangement provides easier assembly and a less expensive wire harness by having all four wires from the transformer ballast go to the blind cone 21'. Blind cone 21' therefore receives all four wires. In this preferred construction there is no need for a socket located between elements 21" and 29 which was another inventive arrangement. The ultraviolet bulb has four terminals on one end and none on the other end. FIG. 3B also illustrates two Teflon ®-coated wires on the outside of the tube for locating two pins of the tube.

The access cone 29 is located at the point of entry where the light bulb is inserted into the unit. This part also has a taper on it to help align the bulb. Now the ultraviolet chamber subassembly is snapped in the upper housing by means of canti-lever snaps on the upper housing which interfaces with feet on the two cones.

As mentioned above, the unit is made up of housing elements 20a, 20b, 20c and 20d. The storage bin 20d snaps onto the upper housing 20a and provides storage space for excess power cord and twin tubing 11. The storage bin also has molded into it two grooves which serve as a receptacle for the mounting brackets. The upper housing 20a contains the means for holding the power cord strain relief and the means for the twin tube to exit from the inside of the unit. It also contains the mounting bosses necessary to screw in the filter cartridge. When the upper and lower housing are screwed together, they form a clam shell interface with a groove on the filter housing. The door 20c is attached to the upper/lower housing subassembly by an interference fit.

It should also be noted that the filter housing 26 interfaces with the filter cap 28 by an "O" ring 31. This is a standard "O" ring static seal. The preferred material is 200 series clear polycarbonate manufactured by Dow Chemical.

In order to provide an aesthetically pleasing unit, the twin tube 11 and power cord are routed in a predetermined aesthetic way. To accomplish this, an extrusion was designed to hold both the power cord and twin tube. The extrusion is basically an open rectangle having one side open and providing that side with protrusions to hold the twin tube at its center. The power cord can be inserted through the top and the twin tube 11 can either be slid into the extrusion or pressed in from the top. The extrusion employs double sided tape so that it can be placed on the countertop backsplash permanently.

Figure 4:
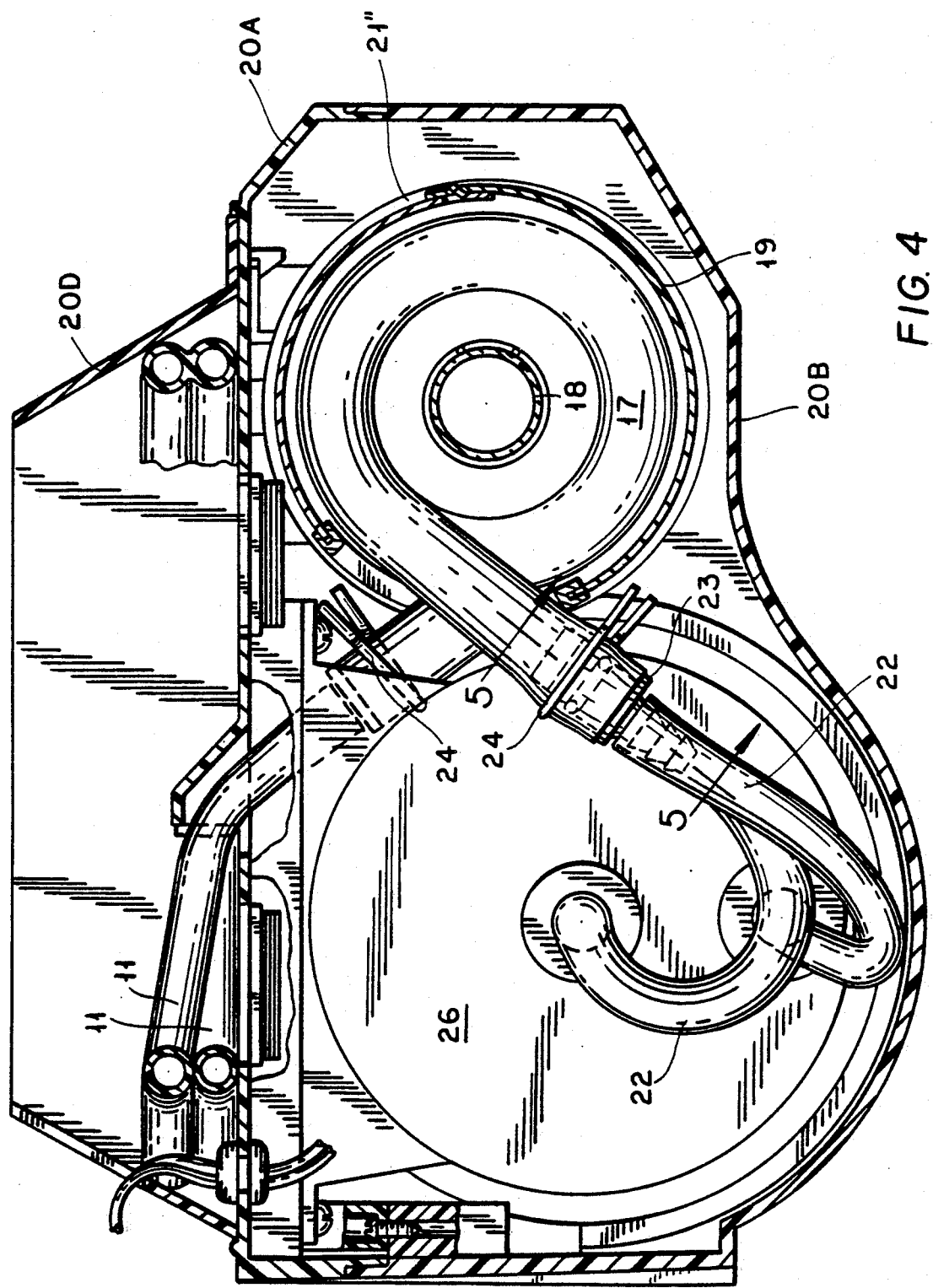
FIG. 4 illustrates a side, cross-sectional view taken along 4—4 of FIG. 2.

In order to understand the nature of interconnection as to how the unit is assembled, FIG. 4 illustrates the side view of the helical coils 17, the ultraviolet tube 18, the nipple connectors 23, the rotor clips 24 and the filter 26. The connections of the metal reflector 19 in locking assembly are also illustrated.

In contrast to the prior art arrangement employing helical-coiled elements where the filters are arranged perpendicular to the coil arrangement, the filter of the present design is arranged parallel and adjacent to the helical coil arrangement. This provides for compactness and keeps the coupling length of tubing to a minimum. The tube arrangement is compact and is especially adapted to a variety of above-the-counter locations. The closed reflective ultraviolet chamber utilizes the ultraviolet energy to a maximum degree and prevents the ultraviolet energy from deleteriously affecting other elements of the system. Finally, the specially-designed connections provide water-tight and leakproof coupling to the helical coils capable of withstanding substantial water pressure and cycling over a long term.

While the foregoing description and drawings represent the preferred embodiments of the present invention, it will be obvious to those skilled in the art that various changes and modifications may be made therein without departing from the true spirit and scope of the present invention.

What is claimed is:

1. In a water purification system having a longitudinal tube for the supply of ultraviolet energy, a pair of helical ultraviolet energy-transparent plastic coils surrounding the tube, and a longitudinal filter, wherein water is exposed to ultraviolet energy before and after flowing through the filter, the improvement comprising:

a unitary housing having a mounting or support surface for mounting said housing to the undersurface of an above-counter kitchen cabinet or the backsplash of a kitchen sink, or supporting said housing on the kitchen countertop;

said filter, ultraviolet tube and helical coils being arranged within said unitary housing;

said filter being disposed directly adjacent to the arrangement of said coils and said ultraviolet tube with the longitudinal axis of said filter parallel to the longitudinal axis of said tube; a water supply tube coupling the unfiltered water to one of the helical coils at a connection point and a water return tube coupling the filtered water from the other of said coils to a kitchen sink faucet at another connection point;

nipple connecting elements utilized at each connection point, said elements having a barbed portion for connection to one of said water carrying tubes and a recessed portion for connection to one of said helical coils;

the ends of each coil extending over the recessed portion of the associated connecting element and being clamped thereto by a rotor clip;

the inner diameter of said water carrying tubes being predetermined to be forced over the barbed portion of the associated connecting element and being secured thereto without the need for additional clamping elements; and means for operating the system directly from the kitchen sink faucet.

2. The water purification system of claim 1, including a filter housing for said filter element, and barbed connecting elements being mounted on said filter housing for coupling a pair of water supply tubes from said coils to said filter.

3. The water purification system of claim 1, wherein said operating means includes a faucet spout having a diverter valve, and a pair of barbed connecting elements for coupling water supply and return tubes to said faucet.

4. The water purification system of claim 1, including a closed reflecting ultraviolet chamber surrounding the assembly of ultraviolet tube and helical coils.

5. The water purification system of claim 1, wherein all the electrical wires for providing power to the ultraviolet tube are brought to one end of said tube.

6. In a water purification system having a longitudinal tube for the supply of ultraviolet energy, a pair of helical ultraviolet energy-transparent plastic coils surrounding the tube, and a longitudinal filter, wherein water is exposed to ultraviolet energy before and after flowing through the filter, the improvement comprising:

a unitary housing having a mounting or support surface for mounting said housing to the undersurface of an above-counter kitchen cabinet or the backsplash of a kitchen sink, or supporting said housing on the kitchen countertop;

said filter, ultraviolet tube and helical coils being arranged within said unitary housing, and wherein all the electrical wires for providing power to said ultraviolet tube are brought to one end of said tube;

said filter being disposed directly adjacent to the arrangement of said coils and said ultraviolet tube with the longitudinal axis of said filter parallel to the longitudinal axis of said tube;

a closed reflecting ultraviolet chamber surrounding the assembly of ultraviolet tube and helical coils;

a water supply tube coupling the unfiltered water to one of the helical coils at a connection point and a water return tube coupling the filtered water from the other of said coils to a kitchen sink faucet at another connection point;

nipple connecting elements utilized at each connection point, said elements having a barbed portion for connection to one of said water carrying tubes and a recessed portion for connection to one of said helical coils;

the ends of each coil extending over the recessed portion of the associated connecting element and being clamped thereto by a rotor clip;

the inner diameter of said water carrying tubes being predetermined to be forced over the barbed portion of the associated connecting element and being secured thereto without the need for additional clamping elements;

a filter housing for said filter elements;

barbed connecting elements being mounted on said filter housing for coupling a pair of water supply tubes from said coils to said filter; and means for operating the system directly from the kitchen sink faucet, said means including a faucet spout having a diverter valve and a pair of barbed connecting elements for coupling water supply and return tubes to said faucet.

* * * * *